United States Patent [19]

Hollis Jr

[11] Patent Number: 4,874,998
[45] Date of Patent: Oct. 17, 1989

[54] MAGNETICALLY LEVITATED FINE MOTION ROBOT WRIST WITH PROGRAMMABLE COMPLIANCE

[75] Inventor: Ralph L. Hollis Jr, Yorktown Heights, N.Y.

[73] Assignee: International Business Machines Corporation, Armonk, N.Y.

[21] Appl. No.: 211,113

[22] Filed: Jun. 21, 1988

Related U.S. Application Data

[63] Continuation of Ser. No. 61,930, Jun. 11, 1987, abandoned.

[51] Int. Cl.$^4$ .............................................. G05D 11/08
[52] U.S. Cl. .............................. 318/568.21; 318/567; 318/687; 318/640; 310/166; 310/90.5; 901/29; 901/30; 901/38; 364/513
[58] Field of Search ........ 318/568, 640, 687, 565–572; 901/14–16, 9, 20, 24, 26, 21, 23, 29, 30–39, 48; 414/719, 735, 736, 741, 751; 310/166, 90.5; 364/513

[56] References Cited

U.S. PATENT DOCUMENTS

| | | | |
|---|---|---|---|
| 3,061,805 | 10/1962 | Brodersen | 310/90.5 X |
| 3,184,271 | 5/1965 | Gilinson | 310/90.5 |
| 3,948,093 | 4/1976 | Folchi et al. | 901/29 X |
| 4,078,436 | 3/1978 | Staats | 310/90.5 |
| 4,156,548 | 5/1979 | Anderson et al. | 308/10 |
| 4,244,629 | 1/1981 | Habermann | 310/90.5 |
| 4,316,394 | 2/1982 | Dohogne | 310/90.5 |
| 4,402,053 | 8/1983 | Kelley et al. | 414/730 X |
| 4,509,002 | 4/1985 | Hollis Jr. | 318/640 |
| 4,514,674 | 4/1985 | Hollis et al. | 318/687 |
| 4,536,690 | 8/1985 | Belsterling et al. | 318/687 |
| 4,595,334 | 6/1986 | Sharon | 901/45 X |
| 4,597,613 | 7/1986 | Sudo | 310/90.5 |
| 4,602,848 | 7/1986 | Honds et al. | 318/115 X |
| 4,611,863 | 9/1986 | Isely | 310/90.5 |
| 4,645,409 | 2/1987 | Gorman | 901/29 X |
| 4,686,404 | 8/1987 | Nakazeki et al. | 310/90.5 |
| 4,694,230 | 9/1987 | Slocum et al. | 318/568 |
| 4,700,094 | 10/1987 | Downer et al. | 310/90.5 |
| 4,739,241 | 4/1988 | Vacht sevanos et al. | 318/568 X |

Primary Examiner—William M. Shoop, Jr.
Assistant Examiner—Paul Ip
Attorney, Agent, or Firm—Philip J. Feig

[57] ABSTRACT

Selective compliance in up to six degress of freedom in a magnetically levitated fine motion device, or robot wrist, with limited motion in X,Y,Z, ROLL, PITCH, YAW, is provided by controlled actuation currents applied to six electrodynamic forcer elements. The wrist has a stator support base defining a dual periphery, carrying a number of stator magnet units. A shell flotor unit nests within the stator support base dual periphery, and carries forcer coils at locations corresponding to respective magnet units. The magnet unit and related flotor coil form a forcer element. There are a number of forcer elements. The vector sum of all the translational forces and rotational torques established at the forcer elements determines the X,Y,Z, ROLL, PITCH, and YAW motion of the flotor. The flotor carries an end effector which may be a tool. Position and orientation of the flotor is monitored by light emitting diodes and lateral effect cells. Coil currents are controlled as a composite of present position, desired final position, and desired compliance. As the fine motion device approaches its final position, the control unit changes forcer coil current patterns at various sets of forcer elements, to provide selected compliance in one or more degrees of freedom while approaching and finally while maintaining the desired position. Cooling is provided as needed; docking and locking provision is made to allow de-energizing the coils for cooling, motion of the base, or shutdown.

16 Claims, 4 Drawing Sheets

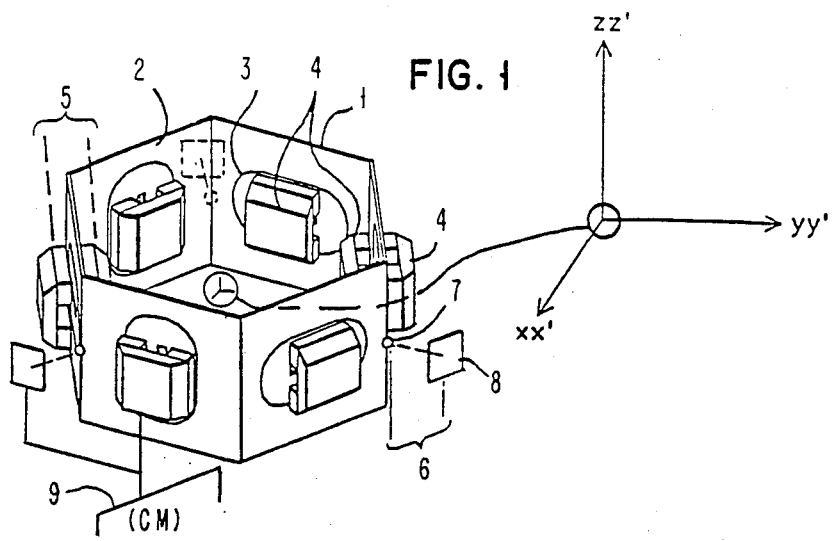
FIG. 1
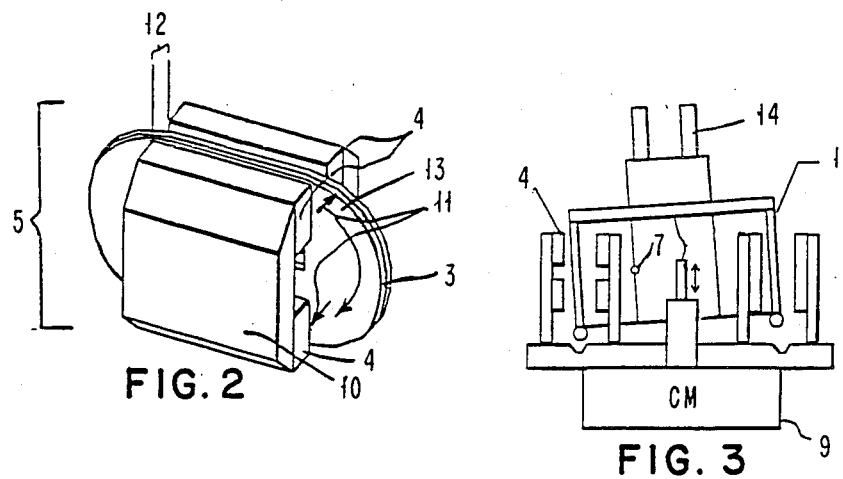
FIG. 2
FIG. 3
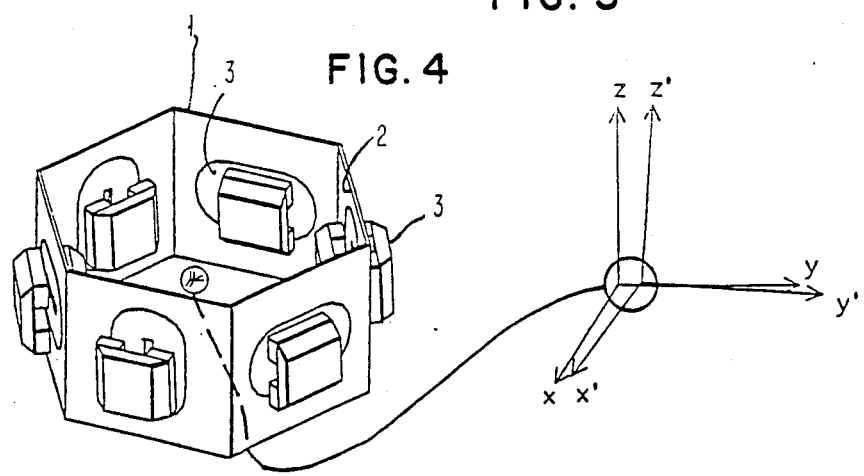
FIG. 4

MAGNETICALLY LEVITATED FINE MOTION ROBOT WRIST WITH PROGRAMMABLE COMPLIANCE

This application is a continuation of application Ser. No. 061,930, filed June 11, 1987, now abandoned.

BACKGROUND OF THE INVENTION

1. Field of the Invention

This invention relates to multiple-degree-of-freedom fine motion devices and more particularly relates to a magnetically-levitated fine motion device having programmable compliance as well as programmable motion.

2. Description of the Prior Art

It has long been recognized that robot control simply by tracking position goals has many limitations when dealing with real-world environments. Compliance is required; that is, there is a need for ability to yield elastically when a force is applied. There has been a great deal of work in the past aimed at giving robot manipulators some form of compliant behavior, and/or control by tracking force goals, etc. Much of this effort has failed to provide satisfactory performance, and applications to the manufacturing domain have been few, if any. Much has to do with the mechanical nature of the manipulator itself. When compliance or force control of a standard industrial robot is attempted, the results are usually dominated by high masses and inertias, as well as friction effects. These effects are difficult to overcome by the generally weak and poorly performing actuators. Additional problems lie with the effective computational bandwidth of the control system.

An approach to this problem is to divide the robot manipulation task into coarse and fine domains. That is, the manipulator itself has redundant coarse and fine degrees of freedom. Here, some form of endpoint sensing is used to measure the directly relevant task parameters and to guide the manipulator system to achieve the desired goal. This paradigm is described in R. L. Hollis, and M. A. Lavin, "Precise Manipulation with Endpoint Sensing," International Symposium on Robotics Research, Kyoto, Japan Aug. 20–23, 1984, and IBM J. Res. Develop. 29, pp. 363–376, July,1985.

For an extremely wide range of robotic assembly tasks especially in the electronics industry, it is only necessary to provide fine compliant motion over limited distances. e.g. fine compliant motion over distances of the order of the features on the parts to be manipulated. It is explicity not required to have compliant motion capabilities over the entire range of motion of the manipulator. Thus, in such a coarse-fine system, the coarse manipulator (CM) can be operated in a strict position-controlled mode, while the fine manipulator (FM) attached to it can be operated in compliance mode or force-controlled mode. The mass and moments of inertia of the FM can be several orders of magnitude smaller than those of the CM, and the motion of the FM can be made frictionless. Accordingly, the desired robot behavior is at least theoretically achievable, assuming a near-ideal FM. The ideal FM should include:

- 6 degrees of freedom (DOF) redundant with those of the CM;
- minimal mass to avoid adversely loading the CM;
- very high acceleration to make it possible to respond to vibrational disturbances in the environment and maximize job throughput;
- minimal static friction, since the presence of static friction causes loss of accuracy and difficulties with control;
- FM positional resolution much smaller than the CM for high precision;
- FM motion range as large as possible, to avoid extra motion of the CM;
- adequate damping.

PATENT PRIOR ART

U.S. Pat. No. U.S. Pat. No. 3,260,475, Ormsby et al, "Space Vehicle Directing Apparatus," July 12, 1966, shows the use of a levitated stainless steel ball (weightless in space) electrostatically suspended (or suspended magnetically or pneumatically) and corrected for centering, and used as a base for rotating the entire spacecraft about the sphere by inducing electric currents in the rotor ball and relying on the reaction torque to move the spacecraft.

U.S. Pat. No. 3,732,445, Laing, "Rotating Pole Rings Supported in Contactless Bearings," May 8, 1973, shows a hydrodynamic bearing for a spherical rotor.

U.S. Pat. No. 4,445,273, Van Brussel et al, "Displacement Control Device," May 1, 1984, shows a position-orientation-compliance device with separate motors synthesizing linear and torsion springs.

U.S. Pat. No. 4,509,002, Hollis, "Electromagnetic Fine Positioner," Apr. 2, 1985, teaches a two-axis fine positioning device based on electromagnetic principles.

U.S. Pat. No. 4,514,674, Hollis and Musits, "Electromagnetic X-Y-Theta Precision Positioner," Apr. 30, 1985, teaches a related three-axis positioner.

U.S. Pat. No. 4,661,737, M. Barri, "Electrical Machines With Multiple Axes of Rotation," Apr. 28, 1987, shows a motor with a constrained spindle in a ball rotor which is movable in a range within a socket stator which is movable within a base member.

U.S. Pat. No. 4,155,169, S. H. Drake, "Compliant Assembly System Device," May 22, 1979, teaches a passive compliance remote center robot end effector for insertion of pegs into holes.

PUBLICATION PRIOR ART

H. Van Brussel and J. Simons, "The Adaptable Compliance Concept and its use for Automatic Assembly by Active Force Feedback Accommodations," 9th International Symposium on Industrial Robots, Washington, D.C., 1979, pp. 167–181.

M. R. Cutkosky and P. K. Wright, "Position Sensing Wrists for Industrial Manipulators," 12th International Symposium of Industrial Robots, 1982, pp, 427–438.

Andre Sharon and David Hart, "Enhancement of Robot Accuracy Using Endpoint Feedback and a Macro-Micro Manipulator System" American Control Conference proceedings, San Diego, California, June 6–8, 1984, pp. 1836–1842.

Kazuo Asakawa, Fumiaki Akiya, and Fumio Tabata, "A Variable Compliance Device and its Application for Automatic Assembly," Autofact 5 conference proceedings, Detroit, Michigan, Nov. 14–17, 1983, pp. 10-1 to 10–17. S. C. Jacobsen, J. E. Wood, D. F. Knutti, and K. B. Briggers, "The Utah/M.I.T. Dextrous Hand: Work in Progress," Int. J. of Robotics Research, 3[4], 1984, pp. 21–50.

There have been a number of studies and experimental fine motion devices with some measure of compliance control, using various actuation mechanisms. These include a five-axis DC-motor-driven adaptive compliance system (Von Brussel and Simons); a five-axis hydraulic fine motion robot wrist based on expandable elastomeric balls (Cutkosky and Wright); a five-axis hydraulic fine motion robot wrist based on hydraulic cylinders (Sharon and Hardt); an electrodynamic variable compliance device for automatic assembly (Asakawa et al); a four-finger robot hand with compliance adjustable by changing air pressure in pneumatic cylinders (Jacobsen et al).

The human hand and wrist of course is a masterpiece of multiple-DOF positioning with selective compliance. The human hand can deliver a sheet of paper, an egg or a bowling ball, with brain-program-control of skeletal motion with muscular and opposed-muscular motion and compliance. The arm is a CM device; the hand is an FM device with selective compliance in many degrees of freedom.

Magnetically levitated bearings (usually spindle bearings) are known. These devices commonly are electromagnetic rather than electrodynamic as in the present invention, and use very narrow gaps to achieve the highest possible fields. There is no attempt at compliance, since the desire usually is to spin at high speed without wobble or friction. The control system is designed as a regular (to maintain position and orientation) and the devices are not capable of general position and orientation tasks.

It is also known to provide passive damping, by contrary fields set up by eddy currents in conductive plates, in a magnetic actuator such as the "homopolar generator."

This complex body of prior art does not, however, teach nor suggest the invention, which is a robot wrist with programmable multiple degrees of freedom and with programmable variable compliance in at least one degree of freedom.

SUMMARY OF THE INVENTION

The object of the invention is to provide a fine motion robot wrist which can accomplish moves over limited distances and limited angles in each of six degrees of freedom, such as X, Y, Z, ROLL, PITCH, YAW, in any combination of these, with programmable compliance in up to six degrees of freedom.

A feature of the invention is magnetic levitation of the wrist and its end effector with programmable electrodynamic positioning and with simultaneous programmable compliance introduced by the control system.

An advantage of the invention is that it accomplishes very high speed positioning with great accuracy, and with the following characteristics:
- Full 6-DOF compliant fine motion;
- Very high performance for light payloads;
- Extreme simplicity, with only one moving part;
- Novel combination of actuation, support, sensing, and control means;
- Docking mechanism to allow coils to cool during coarse motion; •
Noncontact position and orientation sensing with approximately 1 μm resolution;
- Multiple possible control modes, including active compliance control to mimic the behavior of mechanisms.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 1 is a diagram of a six-DOF hexagonal fine motion wrist, having six forcer units with associated coordinate systems.

FIG. 2 is a diagram of one forcer unit, with flat coil, four permanent magnets and two return plates.

FIG. 3 is a semidiagrammatic section view through the fine motion wrist.

FIG. 4 is a translated and rotated hexagonal model fine motion wrist identical to that of FIG. 1, with motion diagram.

DESCRIPTION OF A PREFERRED EMBODIMENT OF THE INVENTION

Figure 5:
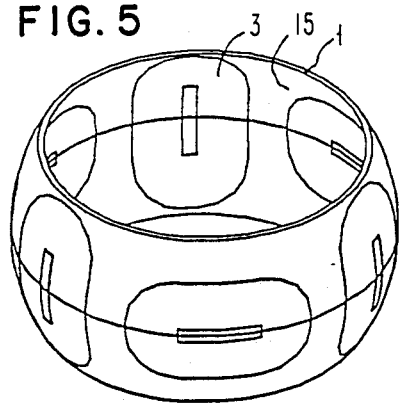
FIG. 5 is a diagram of a spherical fine motion wrist.

FIG. 1 illustrates a hexagonal six-DOF fine motion robot wrist appropriate for programmable variable compliance in a preferred embodiment of the invention. The wrist can be mounted on the end of a standard position-controlled robot to give the coarse motion robot the ability to execute fine, compliant motion. The robot (CM) provides coarse motion; the wrist (FM) provides fine motion and selective compliance under program control. The magnetically levitated FM wrist of the preferred embodiment features a single moving part, a dynamically levitated movable "flotor" element 1. A hollow rigid shell-like moving flotor shell 2 contains planar or quasi-planar curved magnetic flotor coils 3. The flotor unit 1 is the levitated structure of the wrist; it bears the same relationship to the fixed structure (stator) as does the more commonly known rotor is a magnetic bearing, hence "flotor." Note that the relative position of flotor and stator as moving and fixed elements, respectively, may be exchanged, but for clarity the coil-bearing element will be designated the flotor in this text. The flotor 1 structure carries the tool chuck or gripper (not shown). The tool chuck or gripper, or equivalent, whether with or without a tool, may be called the "end effector," or simply the "hand."

HEXAGONAL FLOTOR

FIG. 1 shows a flotor unit 1 which is in the conformation of a prism of hexagonal cross-section. The flotor coils 3 are integral to "forcer" elements, each flotor coil 3 interacting with its respective magnet assembly 4 within the related forcer element 5 to produce motion of the flotor unit 1. In the preferred embodiment, a flexible ribbon cable provides electrical connections to the coils 3 without restricting motion of the flotor 1. There are six forcer elements in FIG. 1, shown in two interspersed orthogonally situated triads. That is, adjacent forcer elements are oriented at right angles to each other around the hexagonal flotor unit 1. The flotor coils 3 operate within large magnetic gaps in a fixed stator structure containing permanent magnets, along with relative position sensing devices related to flotor and stator. Suitable control means for flotor coil 3 currents is provided to produce a fine motion device capable of moving with high translational and rotational accelerations over distances and angles limited by the magnetic gaps. The forcer elements 5 are arranged in such a manner as to provide three orthogonal translational degrees of freedom (X,Y,Z) and three orthogonal rotational degrees of freedom (ROLL, PITCH, YAW) developed by coil currents specified by a control unit not shown in FIG. 1. As shown in FIG. 1, the six forcer elements are not arranged identically, but rather are rotated 90° from their adjacent forcers. In the preferred embodiment, they are alternately horizontal and vertical. These may be parallel to flotor unit 1 top surface as shown in FIG. 1, or may be at +45°, −45°, +45°, or otherwise to accomplish the same purpose. The hollow moving shell flotor unit 1 is suspended by actively controlled magnetic levitation in such a manner that the compliance (stiffness) can be varied over a wide range of magnitudes and directions under program control.

PERIPLANAR COIL

The flotor unit 1 has a preiplanar coil (planar to match the rectangular face of flotor unit 1 with hexagonal preiphery, or curved to match a different flotor unit 1 configuration with curved periphery.) For six degrees of freedom, a number (at least six) of flat-wound periplanar (flat or curve) flotor coils 3, operating in magnetic fields produced by permanent magnet assemblies are required to produce actuation forces and torques in three dimensions. The periplanar coils 3 are rigidly incorporated in the lightweight hollow shell flotor unit 1 which comprises the moving part of the wrist. Alternatively, for some applications, the magnets 4 and associated structures can be made to move, with the flotor unit 1 coil structure fixed, and arrangement which has some advantages for cooling. The position and orientation of the moving wrist is measured by sensors 6. Light emitting diodes 7 arrayed about flotor unit 1, are sensed by lateral effect cells 8 on the stator support unit 9, which is affixed to the CM device and may be considered as the fixed base as shown schematically by an earth mark. Power for the light emitting diodes 7 is provided by the same flexible cable used for the coils 3. The lateral effect cells 8 provide flotor unit 1 position data feedback for control of the fine motion wrist, controlled by an analog or digital controller (not shown in FIG. 1) in real time in such a manner to achieve a task level purpose such as compliant parts mating in a robotic assembly operation.

The basic electromechanical unit which provides a source of force or (in pairs) torque to the wrist is a periplanar (flat and curved) coil electrodynamic drive unit, or forcer element.

CONFIGURATION OF FORCER ELEMENTS

There are many forcer arrangements which could be used to achieve 6-DOF motion and which would more or less satisfy the above description of the invention. For example, one could have forcer elements arranged on the six faces of a cube, or on six mutually orthogonal paddle-shaped wings, or have eight forcers in an octagonal ring, or have pairs of xy forcers separated by a rod-like element extending in z, etc. for translation and rotation in three-dimensional space. The only strict requirement is that the forcer elements be arranged in such manner that in combination they exert three linearly independent translational force components and three linearly independent torque components on the moving element. If the desired translational force and torque are expressed as a six-element vector $\vec{F}=[F_x,F_y,F_z,\tau_x,\tau_y,\tau_z]$ and the magnitudes of the forcer forces are expressed as the six-element vector $\vec{f}=[f_1,\ldots,f_6]$, they will be related by the $6\times 6$ matrix T:

$$\vec{F}=T\vec{f}.$$

A necessary and sufficient condition for the wrist to operate in six degrees of freedom is that T be nonsingular; that is, it must be possible to calculate $T^{-1}$. Further, the "condition number" of the matrix T is a measure of the design quality. The mathematics of square matrices, computation of eigenvalues of matrices, and computation of inverse matrices are known. It will be apparent to those skilled in the art that numerous arrangements of forcer elements can be configured subject to this constraint.

The preferred embodiment provides six forcer elements 5 and a ring-like shell flotor unit 1. This closed configuration makes it convenient for mounting the wrist on a robot arm and, in turn, for mounting tooling or other end effectors to the wrist.

FIG. 1 shows six forcer elements 5, alternately arranged vertically and horizontally about a ring with a hexagonal cross-section. The inner ring of magnets and return plates are rigidly connected with a ring-shaped mechanical support (not shown) and similarly for the outer ring of magnets and return plates. These inner and outer rings form the fixed stator structure having a closed dual periphery, which attaches to the CM (robot) arm. The middle ring, or flotor, containing the coils, is free to move with six degrees of freedom, within the mechanical limits of the flotor unit 1 periphery nested within the dual periphery of the stator support unit 9. An hexagonal top plate (not shown) serves as an end effector mounting platform.

In FIG. 1, the wrist is shown at its zero position, floating in the magnetic gaps. In this configuration the flotor XYZ and stator X'Y'Z' frames are coincident. For a wrist approximately 200 mm in diameter, translations and rotations on the order of ±4 mm and ±5° are easily achieved. This is a sufficient range for many compliant fine motion assembly tasks.

FORCER ELEMENT

FIG. 2 shows a typical forcer element 5. Four permanent magnets 4 with two permeable return plates 10 provide high fields (arrows 11) in the large gap 12. Current in the periplanar coil 3 interacts with the field to produce a force mutually orthogonal to the field and current directions. The highest energy product magnets available today are those of Neodymium Iron Boron (NdFeB) ($B_{max}H_{max}=35$ megagaussoersteds). A pair of permeable (soft iron or 1008 steel) return plates 10 serve to return the flux. Typical gap flux densities B for the preferred embodiment are about 7 kG. The periplanar coils 3 are wound from flat copper wire with high temperature epoxy insulations. Current i in flotor coil 3 interacts with the field to produce a force $F=BiL$, where L is the effective length of wire in the magnetic gap 12. Flat coils such as those used in the forcer elements similar to those described here are commonly used as actuators in disk files. In disk files, an attempt is made to minimize the gap length to maximize the effective field and reduce stray field. In the present invention, the gap 12 is necessarily much larger than the thickness of flotor coil 3 to allow motion in all six degrees of freedom.

For efficiency in motive force and torque, the gap should be minimized, but this determines the extent of translational fine motion. In practice, a compromise must be struck, but the gap will always be greater than the minimum gap for electrodynamic efficiency.

PASSIVE DAMPING

FIG. 2 shows a forcer element 5 which is preferably equipped for passive damping. Since each motion of the flotor unit 1 is actively controlled for levitation during rest and motion, the control program may synthesize active damping. Nevertheless, the preferred embodiment incorporates passive damping, in addition to this active damping. (see discussion of FIG. 9, infra.) This passive damping is used because it may be difficult to incorporate sensors which directly measure velocity. Passive damping is provided in the preferred embodiment forcer element 5 design (see FIG. 2) by adding a sheet 13 of conducting material, e.g. copper, as facings for the coils 3. As the conducting sheets move in the magnetic gap, eddy currents are generated which are proportional to the velocity, and which generate damping forces which oppose the motion and are proportional to velocity. The passive damping tends to reduce the magnitude of structural vibration modes and simplifies the control algorithm.

FLOTOR LEVITATION

FIG. 3 is an elevation semidiagrammatic section view of the wrist, showing flotor unit 1 holding periplanar coils 3 in juxtaposition with forcer magnets 4. Flotor unit 1 is levitated; that is, it is suspended in space by virtue of magnetic forces. The flotor unit 1 carries end effector 14. Coarse manipulator 9 carries the entire wrist to the appropriate locality. Position and orientation are monitored by sensors 6 (not shown) which include light emitting diodes such as diode 7.

FLOTOR TRAVEL LIMITS

FIG. 4 shows the wrist of FIG. 1 moved toward the limit of its range of travel in all degrees of freedom. The fine FM coordinates X Y Z in FIG. 4 differ almost to their maximum difference, from CM coordinates X' Y' Z'.

SPHERICAL FLOTOR

FIG. 5 shows the flotor unit 1 of a spherical wrist design, using spherical flotor shell 15 and spherical periplanar flotor coils 3. This design has a workspace advantage over a hexagonal shell design. A variation of the spherical shell flotor design, not shown, is a spherical sector taken above the equator with coils moved upward.

Figure 6:
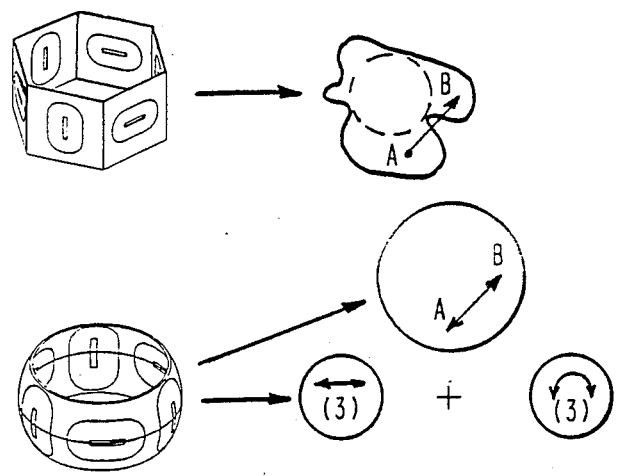
FIG. 6 is a graphical presentation of the translation and rotation constraints of both hexagonal and spherical fine motion wrist designs.

FIG. 6 shows translation and rotation constraints. Up to this point, a hexagonal shell 2 ring structure for the wrist has been discussed in relation to FIGS. 1-4. Unfortunately, the workspace of such a wrist presents some difficulties. Consider the wrist as a moving point in a six-dimensional configuration space which is not convex. Thus, if it is desired to move in a straight line in "joint space" between configuaration A and configuration B, the limits of the workspace may be reached. That is, for example, in rotating the wrist by small angles in ROLL, PITCH, and YAW the translational freedom is greatly curtailed as the periphery of the flotor unit 1 strikes a surface of the dual periphery of the stator support unit 9.

If, however, the wrist is made spherical as in FIG. 5, the six-dimensional configuration space neatly factors into a pair of three-dimensional spaces, one for rotation and one for translation. Full translational freedom for a move from configuration A to configuration B is retained, even if the wrist is rolled, pitched, and yawed, and vice versa for rotational freedom even during X, Y, Z translation.

DOCKING & LOCKING

Figure 7:
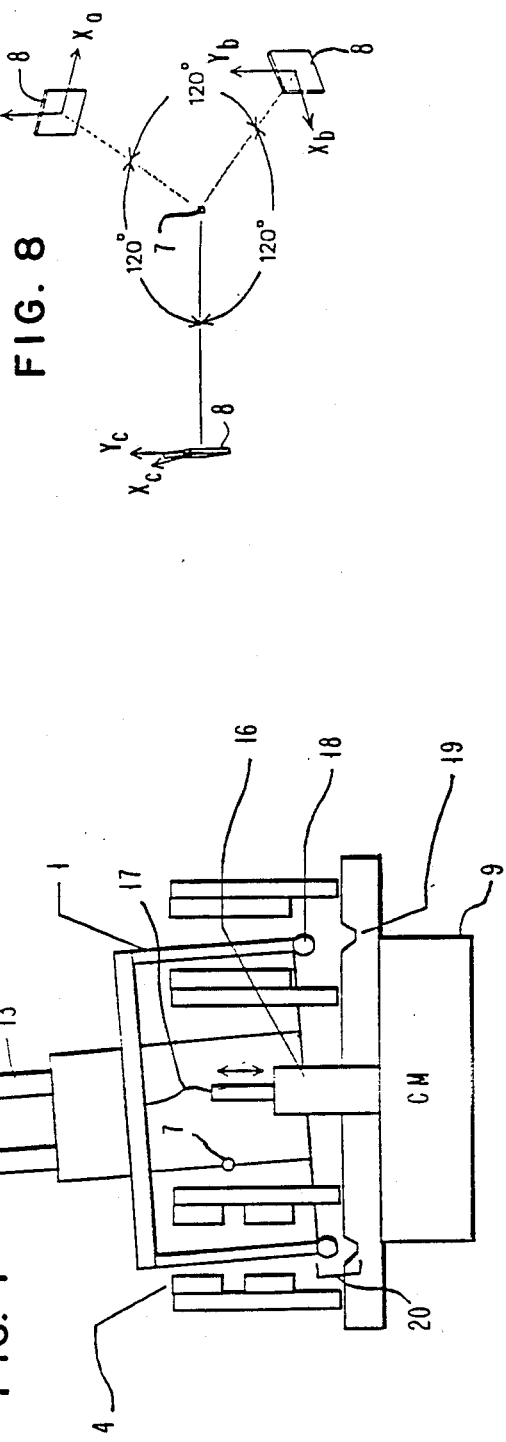
FIG. 7 is a simplified plan view showing docking mechanism incorporated in the wrist of FIG. 3.

FIG. 7 shows a preferred docking and locking mechanism for the flotor unit 1. In a complete robot system with both coarse motion (CM) and fine motion (FM) capability, the fine motion wrist described in this invention need not operate during the coarse motion phase of the robot activity. That is, fine compliant motion need only be executed when the coarse robot is stationary or quasi-stationary after it has completed its motion. The docking mechanism fixes the position of the FM wrist with respect to the CM robot. While the wrist is docked and locked, the wrist coils are preferably de-energized, saving power and allowing the flotor coils 3 to cool.

The moving flotor 1 is attached to a locking means, such as solenoid mechanism 16 and flexible tether cable 17, in such manner that no restriction is placed on the motion of the wrist when levitated. When it is desirable to dock the wrist, such as during the coarse motion phase of the robot, the wrist is moved under program control unit the docking balls 18 detent in the docking sockets 19. Three docking balls 18 and three sockets 19 are shown. Docking balls 18 and sockets 19 together form landing gear or "detenting means." Other locking means such as a magnet, or other detenting means such as the combination of a socket, linear edge and plate are alternative docking means which would provide a kinematically sound arrangement, so long as they are effective and do not interfere with operation or position sensing.

To dock the wrist, the control currents are sequenced to fly the flotor into docking position, in which the docking balls 18 detent in sockets 19; the piston or solenoid 16 is then contracted, locking the wrist in place. Power to the coils can now be turned off. When it is again desirable to activate the fine motion wrist, coil power is again restored in a sequence which forces the balls 18 into the sockets 19 while the piston or solenoid 16 is extended to release the lock. After the lock is released, the wrist can be "flown" away from its docking position under active control whereupon it is again ready to perform some compliant fine motion task.

SENSING

Figure 8:
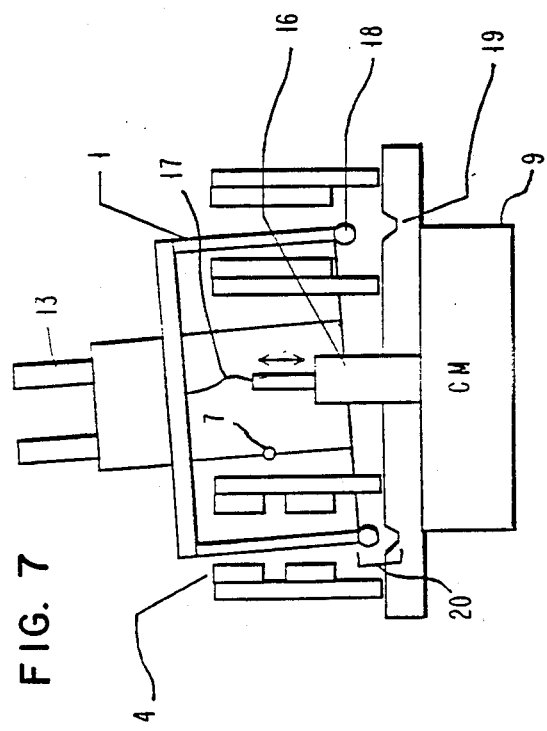
FIG. 8 is a diagram of the position and orientation sensing scheme for the fine motion wrist.

FIG. 8 is a diagram of the sensing means shown in FIG. 1. Accurate sensing of position and orientation in three dimensions is a critical requirement for the operation of the fine motion wrist. The sensing system is built into the wrist itself, and could take many forms. For the present case a sensor scheme based on semiconductor lateral effect position sensing photodiodes 8 was selected. The lateral effect device 8 is a commercially available PIN diode which can measure the centroid position of a light beam falling on it. As with the coil configuration, there are many arrangements of sensor which will yield the required information. Translation and rotation of the wrist is sensed by a set of three two-dimensional lateral effect photodiodes 8 located in the fixed part (stator) of the wrist. Here, the lateral effect photodiodes 8 are symmetrically arranged around the central axis of the fixed part of the wrist.

A triplet of radial light beams 120° apart (dashed lines in FIG. 8) generated by three light projectors 7 attached to the flotor unit 1 impinge on the three lateral effect photodiodes 8. The light beam projectors 7 can be LEDs (light emitting diodes) coupled with suitable optics, or solid state laser. For a general position and orientation of the wrist, the three beam positions are measured in the lateral effect photodiode coordinate systems $(x_a y_a), (x_b y_b), (x_c y_c)$, as shown in FIG. 8. A key observation is that there exists a unique mathematical transformation and its unique inverse transformation between the lateral effect coordinate systems and the body coordinate system X'Y'Z', shown in FIG. 4. The position resolution of the lateral effect photodiodes 8 is roughly 0.5 μm, giving translational and rotational resolutions for the wrist of approximately 1 μm and 0.001°. Sensor and command information must be combined in a stable system which provides control efforts to the actuators to effect desired behavior.

CONTROL

Figure 9:
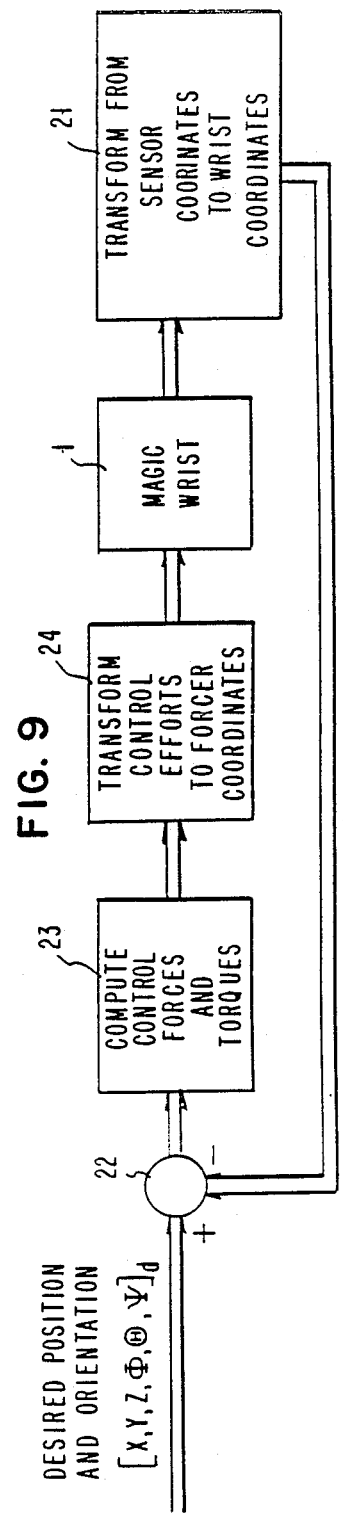
FIG. 9 is a schematic diagram of the control for the fine motion wrist.

FIG. 9 shows the control system. For a coupled nonlinear six-degree-of-freedom system such as this, control is a difficult task. Control systems of this complexity rely on digital computation, and that is what is used here for control of the fine motion wrist. Proper operation depends on:
1. selecting a mathematically correct control strategy, and
2. implementing it on a high speed (probably multiple processor) computer system in such a manner that the loop frequency is high compared with the electromechanical bandwidth.

Similar control problems have been solved for control of spacecraft attitude as measured by inertial sensors (analogous to the wrist position sensors) by turning on and off a plurality of thruster units (analogous to the wrist forcer elements).

As shown in FIG. 9, starting from the plant, block 1, the wrist position and orientation is measured by the sensors 6 and transformed by computation block 21 to the wrist-centered coordinate from X'Y'Z'. These values are subtracted from the desired position and orientation to produce position and angle errors at the summing junction 22. The control computation block 23 computes a force and torque effort of such magnitude and direction to simultaneously reduce the values of all six errors. In a PID (proportional-integral-derivative) implementation, the magnitude of the control effort is proportional to the error. The efforts are diminished by terms proportional to the angular and linear velocities of the moving wrist. These velocities are not directly measured, but are derived from an observer model driven by position and orientation error. Finally, a term proportional to the integral of the error is added in to reduce errors down to the limits of the sensor noise. Following the control block 23, the control efforts are transformed to current values for the wrist coils in computation block 24.

COMPLIANCE CONTROL

With software control, the feedback gain coefficients within block 23 can be changed to vary the compliance of the fine motion wrist from very soft to very stiff. In effect, this amounts to changing the spring constant K in the Hooke's Law relation:

$$F = Kx$$

where F is the force and x is the displacement. Unlike a simple one-dimensional spring, the moving structure of the wrist (flotor) may be considered to be suspended from a system of springs which allow motion in all six degrees of freedom. Each spring is synthesized by the computer program executing the control function for the wrist. That is, when a displacement x is sensed, currents in the coils 3 are adjusted to produce a proportional force F according to the stored parameter K. The above discussison refers to linear springs, but a similar argument holds for synthesized torsional springs where:

$$\tau = K_\theta \theta$$

where $\tau$ is a torque and $\theta$ is an angular displacement.

PROGRAMMABLE LIMIT STOPS

Since the wrist position and orientation is also controlled, this amounts to setting the "zero-point" of each spring in addition to the stiffness. Finally, software-settable "limits stops" can be synthesized which involve modelling a nonlinear spring, for example changing to a very large value of K when the limits of mechanical motion are closely approached. This would prevent the mechanical limit stops from being used except for extreme overloads. For software variable compliance to be achieved, at least two conditions must be met in practice. They are:
1. the wrist must be capable of extremely high accelerations (say, over 40 times the acceleration due to gravity) and
2. the control program must execute very rapidly (say, over 1000 Hz).

EMULATION OF MECHANISMS

Figure 10:
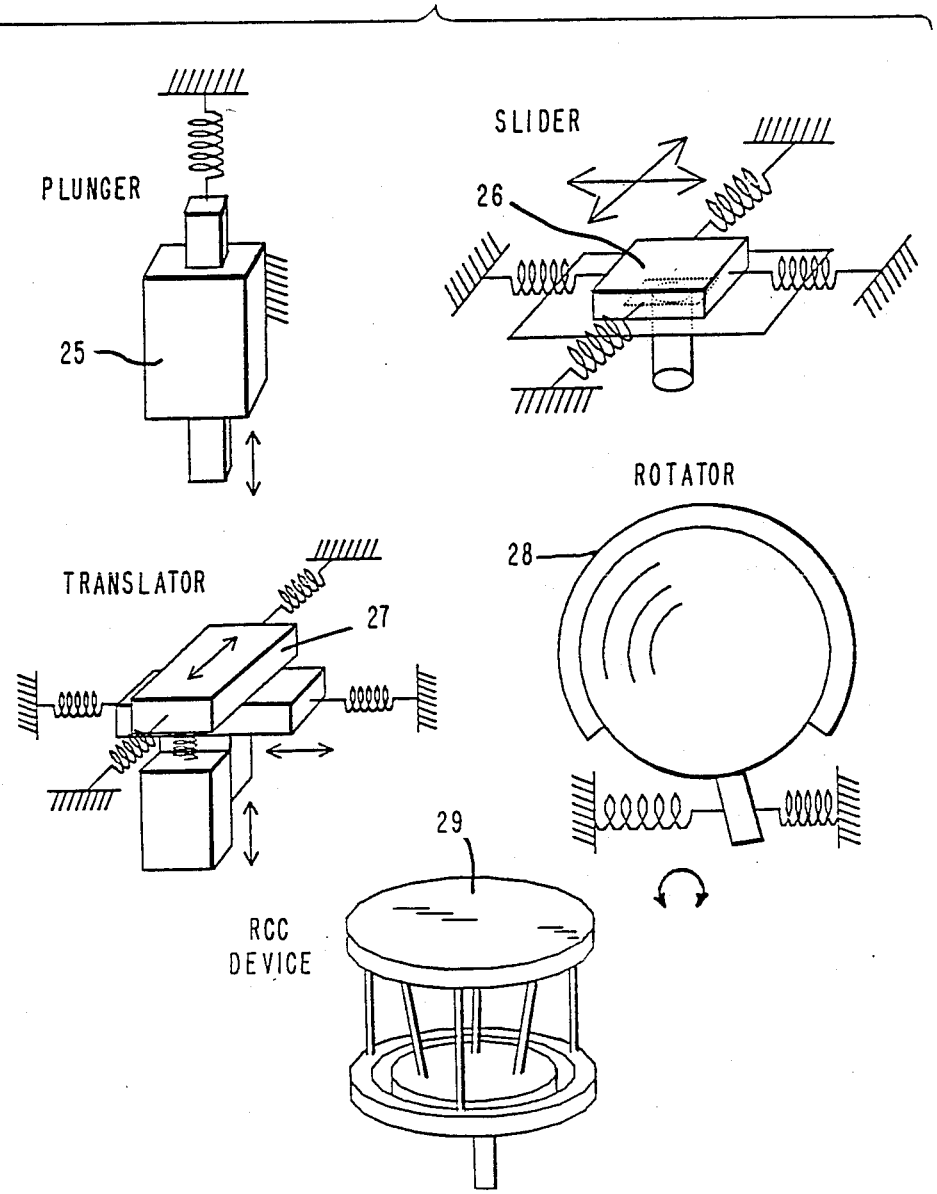
FIG. 10 is a composite schematic diagram of representative mechanisms which may be emulated, under program control, by the fine motion wrist.

By varying compliance under program control, the fine motion wrist described by this invention is able to emulate (that is, pretend to be) many simple mechanisms. A small set of these mechanisms is illustrated by FIG. 10. If the spring constant K is set to be high along all motion directions but one, then a unidirectional plunger 25 is synthesized. If all spring constants are large except two in translation, a slider mechanism 26 results. By setting all the rotational constants high, only translational motion 27 is allowed. Conversely, by setting the translational constants high, a ball and socket rotator 28 is created. By allowing some rotational, and some translational motion, a so-called remote center compliance (RCC) device 29 is synthesized. All of these synthesized mechanisms result from restricting degrees of freedom, and have many useful applications in robotic assembly, for example. Unlike conventional mechanical mechanisms, these are all selectable by program control in real time, and can be altered several times even within a single job cycle. In many respects, this invention provides the basis for a truly useful universal mechanism which is not evident in the prior art.

Thus, while the invention has been described with reference to a preferred embodiment, it will be understood by those skilled in the art that various changes in form and details may be made without departing from the scope of the invention.

What is claimed is:

1. A six-degree-of-freedom fine motion device, having but a single moving part, comprising:
   (a) a stator support unit (9) defining a base and a dual enclosure having dual walls upthrust from the base to define a dual periphery;
   (b) a multiplicity of forcer magnets (4) disposed at spaced positions about said dual periphery;
   (c) a flotor unit (1) having a related periphery nested in said dual periphery of said stator support unit (9);
   (d) forcer elements (5) including a multiplicity of forcer element flotor coils (3) arrayed about said periphery of said flotor unit (1) in active juxtaposition with said forcer magnets (4);
   (e) position and orientation sensing means (6) arrayed about said dual periphery of said stator support unit (9) and about said periphery of said flotor unit (1) to sense the relative positions and orientations of said stator support unit and said flotor unit; and
   (f) control means connected to said position and orientation sensing means (6) in feedback mode, for providing respective forcer elements (5) with electrodynamic actuation appropriate to maintain equilibrium at a desired starting position and orientation, appropriate to cause motion to a desired final position and orientation according to a force-to-displacement ratio K, and appropriate to provide a desired compliance in at least one degree of freedom by selectively lessening the force-to-displacement ratio K in a related set of forcer elements (5).

2. A six-degree-of-freedom fine motion device according to claim 1, wherein said stator support unit (9) dual periphery and said flotor unit (1) periphery are in similar closed configuration, and said forcer elements (5) are six in number arrayed about said dual periphery and said flotor unit periphery of the closed configurations.

3. A six-degree-of-freedom fine motion device according to claim 2, wherein the closed configuration of said dual periphery of said stator support unit (9) and said periphery of said flotor unit (1) are hexagonal in section.

4. A six-degree-of-freedom fine motion device according to claim 2, wherein the closed configuration of said dual periphery of said stator support unit (9) and said periphery of said flotor unit (1) are substantially spherical.

5. A six-degree-of-freedom fine motion device according to claim 1, wherein
   said stator support unit (9) dual periphery and said flotor unit (1) periphery are hexagonal prisms in configuration;
   said forcer elements (5) are six in number, arrayed one to each rectangular surface of the hexagonal prism; and
   said control means provides control values related as a 6×6 square matrix T, with eigenvalues defining that the matrix T is non-singular.

6. A six-degree-of-freedom fine motion device according to claim 1, wherein
   said stator support unit (9) dual periphery and said flotor unit (1) periphery have reactive surfaces which generally follow the surface of a sphere, with the centroid of the sphere internal to and close to the axis of each of said stator support unit (9) and said flotor unit (1) and said forcer elements (5) being arrayed about the surface of the sphere.

7. A six-degrees-of-freedom fine motion device according to claim 1, wherein said forcer elements (5) include forcer magnets (4) on said stator support unit(9) and flotor coils (3) in said flotor unit (1), and said flotor coils (3) generally following the configuration of the periphery of said flotor unit (1) and the positions of respective forcer magnets (4); and
   sets of said forcer magnets (4) disposed substantially opposite each other on the dual periphery of said stator support unit (9) having substantial gaps in which gaps said flotor coils (3) can move during levitated fine motion of said flotor (1) with respect to said stator support unit (9).

8. A six-degrees-of-freedom fine motion device according to claim 1, wherein said forcer elements (5) include forcer magnets (4) on said stator support unit (9) and flotor coils (3) in said flotor unit (1), and said flotor coils (3) generally following the configuration of the periphery of said flotor unit (1) and the positions of respective forcer magnets (4), and said forcer elements further including passive damping means; and
   sets of said forcer magnets (4) disposed substantially opposite each other on the dual periphery of said stator support unit (9) have substantial gaps in which gaps flotor coils (3) can move during levitated fine motion of said flotor (1) with respect to said stator support unit (9).

9. A six-degrees-of-freedom fine motion device according to claim 1, wherein said forcer elements (5) include forcer magnets (4) on said stator support unit (9) and flotor coils (3) in said flotor (1), and said flotor coils (3) generally following the configuration of the periphery of said flotor (1) and the positions of respective forcer magnets (4), and said forcer magnets (4) being configured with sufficient magnetic gap to permit flotor coil movement within the gap sufficient for a desired range of motion.

10. A six-degrees-of-freedom fine motion device according to claim wherein
    said forcer elements are arrayed in two orthogonal groups.

11. A six-degrees-of-freedom fine motion device according to claim 1, wherein
    said stator support unit (9) and said flotor (1) include docking means.

12. A six-degrees-of-freedom fine motion device according to claim 11, wherein
    said docking means includes mechanical detenting means (18-19) and locking means (16-17).

13. A six-degrees-of-freedom fine motion device according to claim 1, wherein
    said stator support unit (9) includes heat transfer means.

14. A six-degrees-of-freedom fine motion device according to claim 1, wherein said stator support unit (9) undergoes motion and said flotor unit (1) remains fixed.

15. A motion and compliance emulation system comprising:
    a matched electrodynamically levitated flotor and stator combination, having clearance gaps between flotor and stator sufficient for a desired range of relative motion and greater than required for electrodynamic efficiency;
    electrodynamic forcer means for receiving coil currents for applying controlled magnetic forces mutual to the flotor and stator and analogous to a number of synthetic springs, each synthetic spring having a zero-point and a stiffness value; and programmable means for controlling both zero-point and stiffness value by controlling the coil currents in sets applied to said forcer elements during the entire range of mutual motion, thereby controlling position, orientation and compliance.

16. A motion and compliance emulation system according to claim 15, wherein
said programmable means for controlling both zero-point and stiffness value includes software settable limit stops, of significant stiffness, near the limits of mechanical motion.

* * * * *